H. I. DILTS.
WATER METER.
APPLICATION FILED FEB. 4, 1909.
1,033,680.
Patented July 23, 1912.
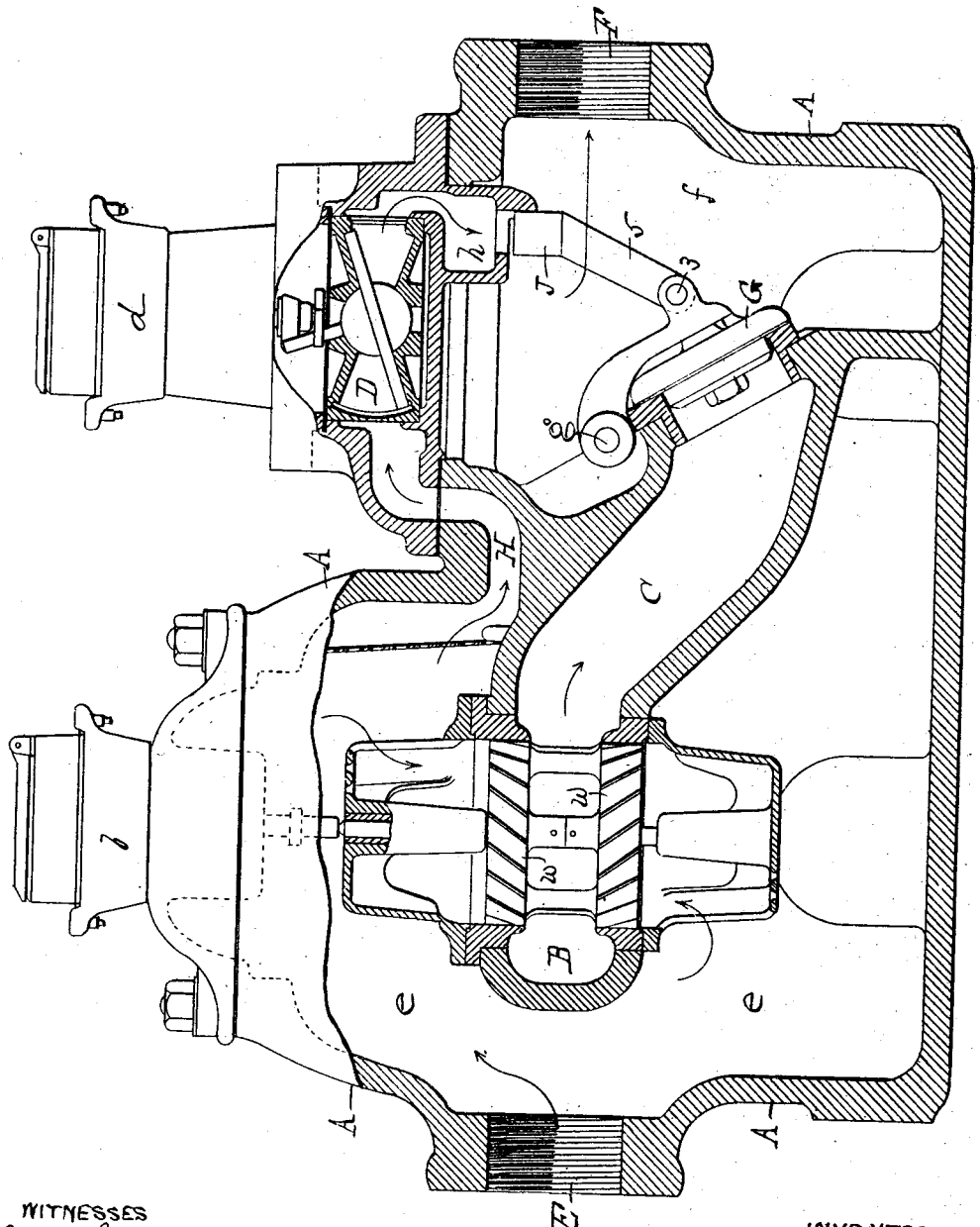
WITNESSES
INVENTOR
Henry I. Dilts
BY
Howson and Howson
ATTORNEYS

UNITED STATES PATENT OFFICE.

HENRY I. DILTS, OF ELMHURST, NEW YORK, ASSIGNOR TO NEPTUNE METER COMPANY, OF LONG ISLAND CITY, NEW YORK, A CORPORATION OF NEW JERSEY.

WATER-METER.

1,033,680.    Specification of Letters Patent.    Patented July 23, 1912.

Application filed February 4, 1909. Serial No. 475,964.

*To all whom it may concern:*

Be it known, that I, HENRY I. DILTS, a citizen of the United States of America, residing in Elmhurst, in the county of Queens, in the State of New York, have invented certain new and useful Improvements in Water-Meters, of which the following is a specification.

The object of my invention is to so construct an apparatus for measuring the flow of water or other liquids that it will register with equal accuracy widely differing rates of flow, that is, small flows and large flows, or in other words, work equally well under the widely differing conditions, where the apparatus has to do "low duty" or "high duty". This object I attain by constructing what may be called a compound meter, wherein a plurality of metering devices, whether of the same general construction or of different constructions, are adapted, one for relatively high duty and another for relatively low duty, and are combined with means whereby the varying pressure differential will itself determine the appropriate metering device through which the flow shall pass and will shut it off for the time being from the other metering device.

I prefer to mount the several metering devices in one casing, and in the accompanying drawing I have shown an embodiment of my invention employing two metering devices of different constructions mounted in the same casing with a common inflow and a common outflow.

In the accompanying drawings the figure is a view of a compound meter embodying my invention, the main part of the apparatus being shown in vertical section, but with the registering tops in elevation.

I have shown within one and the same casing A two metering devices B and D, with their respective registering mechanisms at $b$ and $d$. In the present instance the meter B is shown as of the turbine type and adapted for relatively "high duty" work, that is, to register accurately large flows of liquid. The meter D is shown as of the nutating piston type, and adapted for relatively "low duty" work, that is, to register accurately small flows of liquid.

There is a common inlet or inflow opening at E for the two meters, and a common outlet or outflow at F. The inlet E opens into a chamber $e$, from which the incoming liquid may enter the turbine meter B above and below the turbine wheels $w$, as usual, and thence pass out from the space between the wheels into a conduit C and into the chamber $f$ leading to the outlet F, provided the valve G at the end of said conduit C is open. The incoming flow of liquid has access to the low duty meter D, from chamber $e$, through a conduit H, and after passing through this meter, it can flow through the conduit $h$ into the outlet chamber $f$ and outlet F, provided the valve J is in the open position shown in the drawing. These two valves G and J thus controlling the outlet conduits or passages from the respective meters and therefore controlling the flows through the two branches containing the two meters are connected to work together so that when one valve is opened the other is thereby positively moved to the closed position and vice versa. For this purpose, in the construction shown the valve J, which is indicated as a plug valve, has its stem 5 pivoted at 3 to the back of the valve G, which is illustrated as a weighted check valve pivoted at $g$ to the valve seat.

When the flow of water is small, the difference of pressure between the inlet and outlet is insufficient to raise the weighted valve G from its seat, and so long as that condition continues the liquid will flow only through the "low duty" meter D and will be registered accurately through that meter. But when the pressure differential increases sufficiently to raise the valve G, the valve J will thereby be simultaneously closed, and the "high duty" meter B will come into operation alone, and the large flow will thus be registered accurately by that meter B.

I claim as my invention—

The combination of a relatively high duty meter, a relatively low duty meter, and a common conduit having branches in which the two meters are respectively located, the inflow and outflow being common to both, with a pivoted valve controlling the flow through the high duty meter, and a plug valve controlling the flow through the other meter and having its stem pivoted to the back of the first mentioned valve, as and for the purpose described.

In testimony whereof I have signed my name to this specification, in the presence of two subscribing witnesses.

HENRY I. DILTS.

Witnesses:
WALTER ABBE,
HUBERT HOWSON.